United States Patent [19]

McCoy

[11] 4,408,676

[45] Oct. 11, 1983

[54] GAS GUN ASSEMBLY

[76] Inventor: James N. McCoy, 5001 Ditto La., Wichita Falls, Tex. 76302

[21] Appl. No.: 237,860

[22] Filed: Feb. 25, 1981

[51] Int. Cl.$^3$ ............................................. G01V 1/40
[52] U.S. Cl. ................................. 181/113; 166/255; 181/124; 181/117; 367/908
[58] Field of Search ............ 181/102, 105, 117, 124; 367/35, 81, 908, 83; 73/290 V; 166/255

[56] References Cited

U.S. PATENT DOCUMENTS

| | | | |
|---|---|---|---|
| 2,047,974 | 7/1936 | Lehr et al. | 367/81 |
| 2,156,519 | 5/1939 | Walker | 181/105 |
| 3,316,997 | 5/1967 | McCoy | 367/908 X |
| 3,915,256 | 10/1975 | McCoy | 181/102 |
| 3,958,217 | 5/1976 | Spinnler | 367/83 |
| 4,134,097 | 1/1979 | Cowles | 181/102 X |
| 4,318,298 | 3/1982 | Godbey et al. | 367/908 X |
| 4,351,037 | 9/1982 | Sherbatskoy | 367/85 |

Primary Examiner—Maynard R. Wilbur
Assistant Examiner—K. R. Kaiser
Attorney, Agent, or Firm—Richards, Harris & Medlock

[57] ABSTRACT

A gas gun assembly for measuring depths of reflectors in a well bore includes a housing having a central chamber and bottom bulkhead through which a first valve bore extends. Coupling structure is provided to connect the housing to the well. A cap closure for the chamber has a second valve bore therethrough of diameter larger than the diameter of the first valve bore and is located in axial alignment with the first valve bore. A valve stem has one end axially movable within the second valve bore while closing the same and the other end movable into and out of the first valve bore. A predetermined pressure condition is established across the bulkhead. The valve stem is then released for rapid equalization of pressure across the bulkhead to produce an acoustic pulse in the well bore.

13 Claims, 10 Drawing Figures

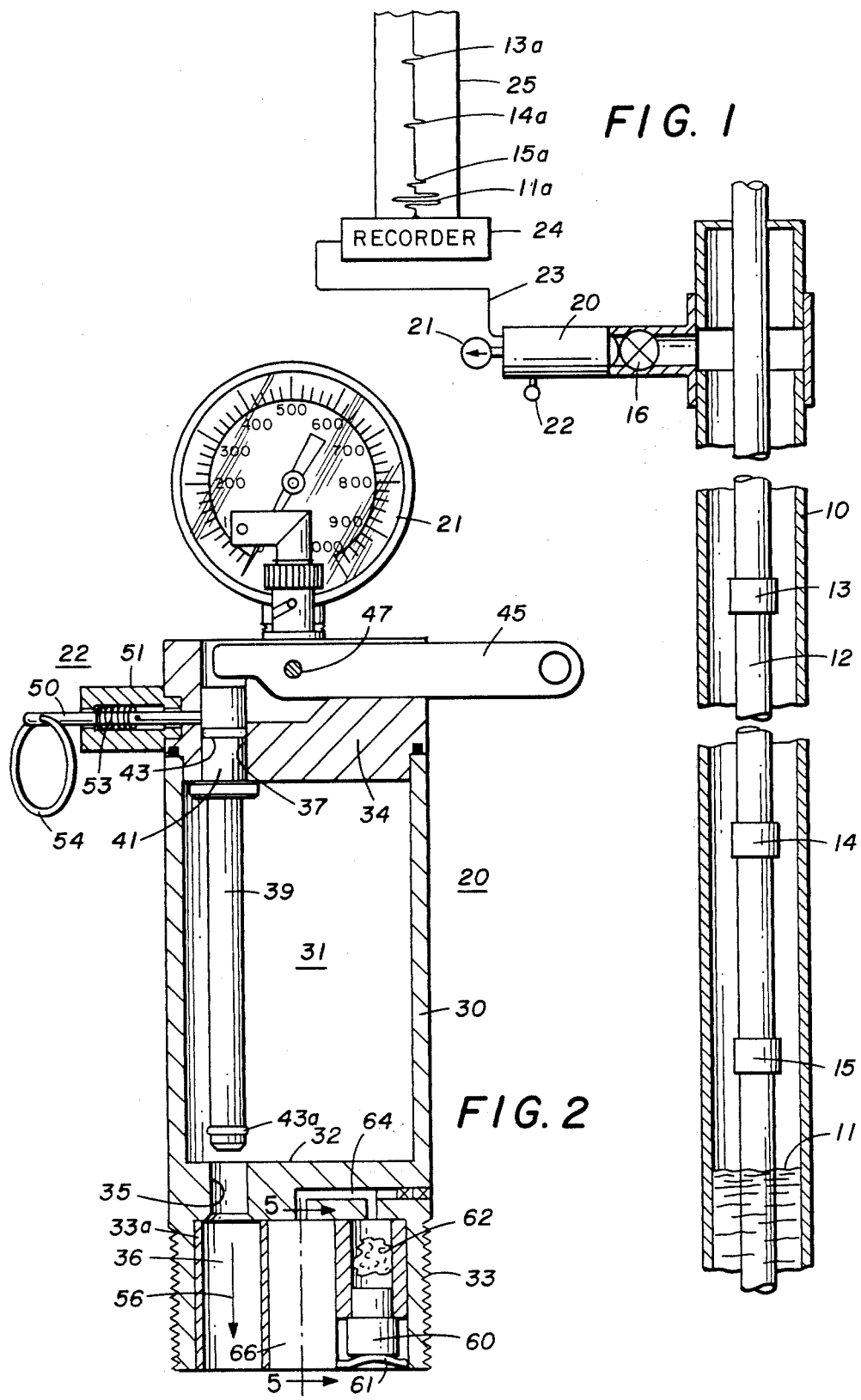

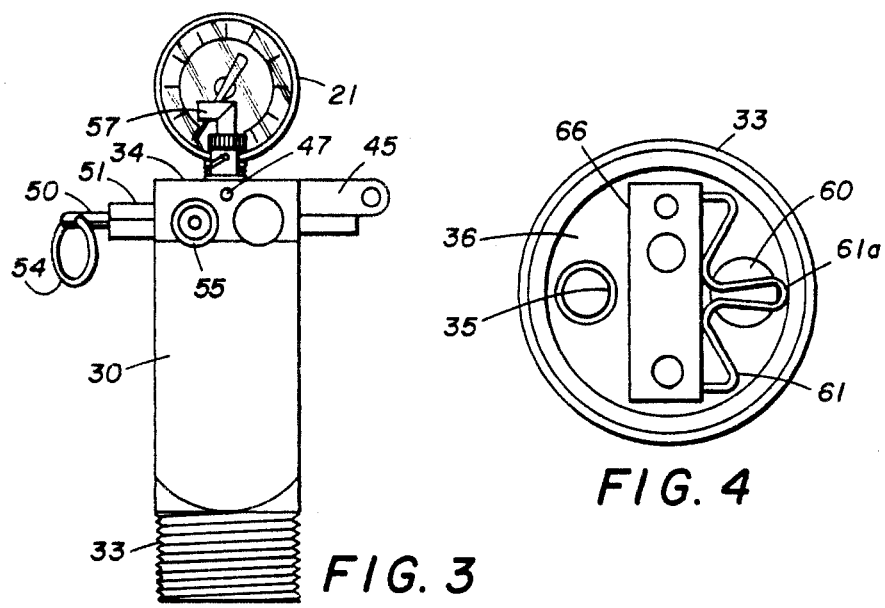
FIG. 3
FIG. 4
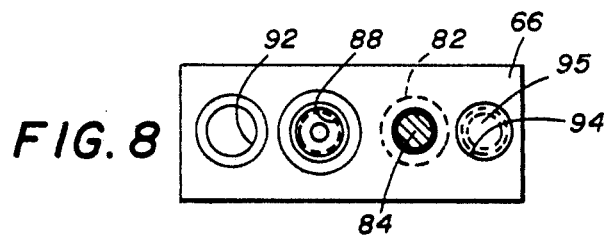
FIG. 8
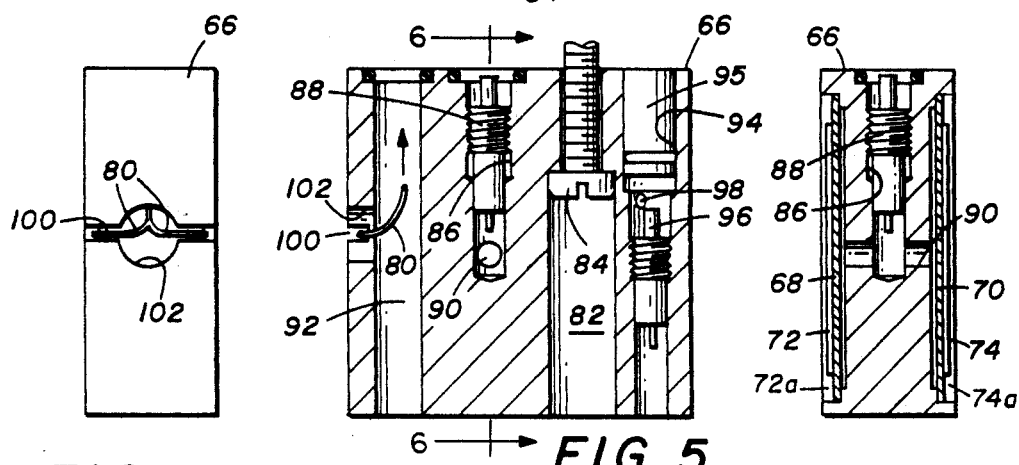
FIG. 7
FIG. 5
FIG. 6
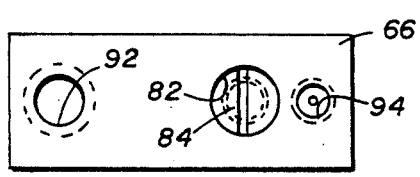
FIG. 9

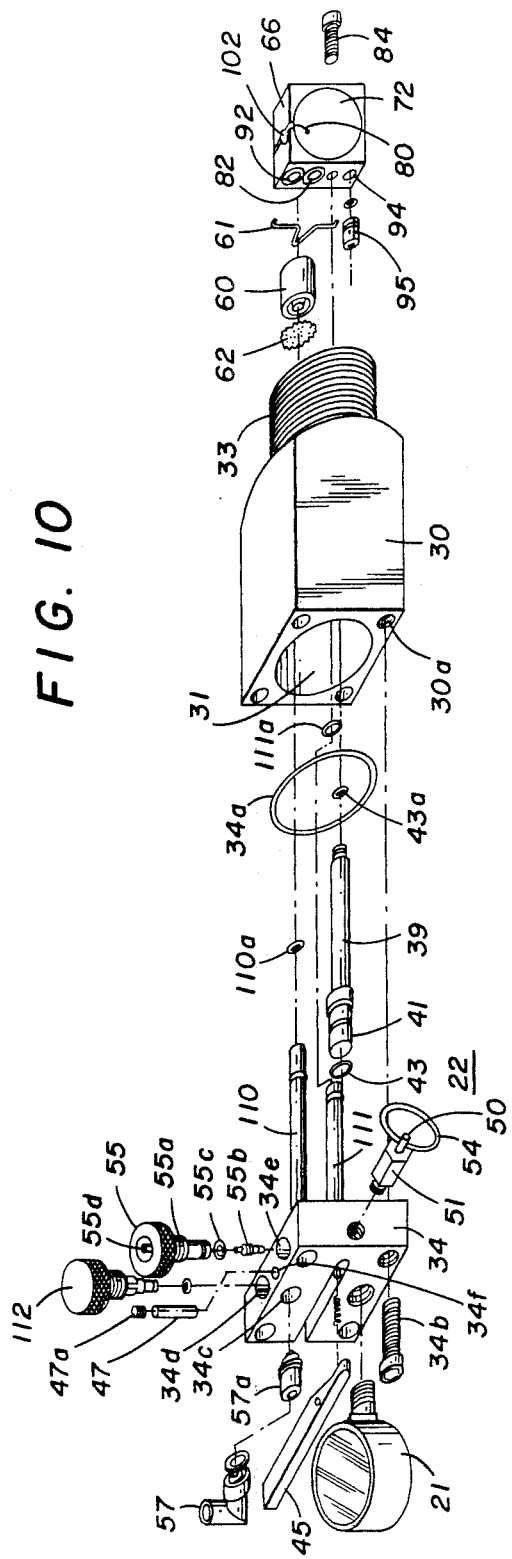

4,408,676

GAS GUN ASSEMBLY

TECHNICAL FIELD

This invention relates to a gas gun assembly for measuring depths of reflectors in a well bore and involves the production of an acoustic pulse in a well bore and sensing acoustic reflections of the pulse from acoustic impedance discontinuities in the bore hole.

BACKGROUND ART

It is often necessary in the petroleum industry to determine the level of a liquid standing in a casing of a well bore. Prior art systems have been utilized for carrying out such measurements. Representative of the prior art are U.S. Pat. Nos. 2,047,974; 2,156,519 and 3,316,997. In each case a pressure wave is introduced into the casing at or near the earth's surface. The pressure wave travels downwardly through the annulus gas between the well tubing and the casing. The sound wave is reflected back to the top of the casing from the gas-liquid interface. In addition, reflections occur at other points of acoustic impedance discontinuity in the bore hole such as from the collars utilized in connecting sections of tubing in the well bore.

Where tubing is standing in the casing and the lengths of the tubing joint are known, depth information may be determined by counting each of the small pressure wave reflections from the tubing collars and then locating the liquid level reflection in relation to the tubing collar reflections. Sometimes, the returning pressure waves or echoes are detected and recorded as a function of time. The collar reflections may be missing or not distinct. The depth or the level of the liquid can then be calculated from the elapsed time and the acoustic wave velocity. In the above-referenced patents, the pressure wave is generated by releasing a high pressure gas from the chamber by means of a valve or by utilization of an explosive charge such as a blank shotgun shell.

The present invention is directed towards a much improved gas gun assembly and particularly to structure which can produce a distinctive high efficiency energy impulse at low cost. The construction dealing with the detector system is so arranged that the gas gun assembly is substantially failsafe providing long life and repeatable excellent results. The use of blank cartridges, such as shotgun shells, has the disadvantage of discharging burning particles of black powder which is a fire hazard and which could cause injury to personnel. The gas gun assembly of the present invention is safer than prior systems. Even though it is small in size, it will give records greatly improved over those obtainable with prior art systems. Further, it can be operated either in the explosion or implosion mode.

DISCLOSURE OF THE INVENTION

In accordance with the present invention, a gas gun assembly is provided for measuring depths of reflectors in a well bore which includes a housing having a central chamber, at the bottom of which is a bulkhead, and a coupling structure for securing the housing to a well. A first valve bore extends through the bulkhead. A cap is provided for closure of the chamber and has a second valve bore therethrough of diameter larger than the diameter of the first valve bore and located in axial alignment with the first valve bore. A valve stem having one end axially movable within the second valve bore while closing same is provided with the other end of the valve stem movable into and out of the first valve bore. Means are provided for establishing a predetermined pressure condition in the chamber. Means are then provided to release the valve stem for rapid equalization of pressure across the bulkhead by way of the first valve bore in response to the force differential effective at the first and second valve bores to produce an acoustic pulse in the well bore below the bulkhead.

BRIEF DESCRIPTION OF THE DRAWINGS

For a further understanding of the invention, reference may now be had to the following description taken in conjunction with the accompanying drawings in which:

FIG. 1 illustrates a typical installation involving the present invention;

FIG. 2 is a simplified sectional representation of certain elements embodied in the present invention;

FIG. 3 is an elevation view of an embodiment of the present invention;

FIG. 4 is a bottom view of the unit of FIG. 3;

FIG. 5 is a sectional view of the detector taken along lines 5—5 of FIG. 2;

FIG. 6 is a sectional view taken along lines 6—6 of FIG. 5;

FIG. 7 shows the detector as viewed from the left side of FIG. 5.

FIG. 8 is a top view of the detector of FIG. 5;

FIG. 9 is a bottom view of the detector of FIG. 5;

FIG. 10 is an exploded view of a preferred embodiment of the invention.

DETAILED DESCRIPTION

FIG. 1

FIG. 1 illustrates a typical installation for the gas gun assembly of the present invention. An oil well casing 10 extends from the earth's surface to and probably below level 11 of liquid standing in the bore hole. A string of tubing 12 also extends through the casing 10 and is characterized by tubing collars 13, 14 and 15. The tubing 12 generally is of uniform lengths so that the collars 13, 14 and 15 are of uniform spacing one from another.

The upper end of the casing 10 is provided with a suitable closure and the well head includes a casing valve 16 which provides for a connection to the inside of the casing 10. A gas gun 20 of the present invention is coupled to the casing valve 16. Gas gun 20 is provided with a pressure gauge 21, a trigger 22 and an electrical signal output channel 21. Channel 23 leads to a recorder 24 which is utilized to provide a record such as a chart 25 of the electrical output of the assembly 20.

In operation, gun 20 may be pressurized (by means not shown). The recorder 24 may then be actuated and the trigger 22 actuated to create an abrupt acoustic wave through the valve 16 and into the annulus gas between casing 10 and tubing 12. The pressure pulse traveling downward through the well is reflected at the tubing collars 13, 14 and 15 as well as from the surface 11 of the liquid standing in the bore hole. A microphone in gun 20 senses the reflections and applies the pressure dependent signals by way of channel 23 to recorder 24. As a result there may be produced a record 25 which includes signals 13a, 14a and 15a which represent reflections from tubing collars 13, 14 and 15. Finally, a high amplitude signal 11a is recorded resulting from the reflection of the pulse from the liquid surface 11.

The foregoing briefly portrays the setting in which the present invention is designed to operate. The invention involves construction of the gas gun 20 such as to give it versatility and performance not heretofore available.

FIGS. 2 AND 3

In FIG. 2, a simplified sectional view of the gas gun 20 has been shown and an elevation view is shown in FIG. 3. Gun 20 includes a housing 30 forming a central cylindrical chamber 31. The lower end of the housing 30 is closed by a bulkhead 32 with a threaded portion 33 extending below the bulkhead 32 and adapted to connect to a well head as through casing valve 16, FIG. 1.

The upper end of the housing 30 is closed by a cap 34. A first valve bore 35 extends through bulkhead 32 near one side of the housing 30. A second valve bore 37 extends upward through cap 34. Valve bores 35 and 37 are located to be in axial alignment. The first valve bore 35 is smaller in diameter than the second valve bore 37.

A valve stem 39 is positioned with the head 41 thereof extending upward into valve bore 37 so that the head 41 of the valve stem 39 is always in valve bore 37. Head 41 is of diameter to close the bore valve 37. An O-ring 43 mounted on the head 41 assures a gas tight seal in valve bore 37. The lower end of valve stem 39 is beveled and is sized to enter and close the lower valve bore 35. An O-ring 43a is installed on the lower end of the valve stem 39 to assure gas tight closure to the bore valve 35 when the O-ring 43a is in contact with the walls of bore 35. A tube 33a is mounted in cavity 36 on the bottom of bulkhead 32. It is axially aligned with bore 35 and extends down to about the bottom of section 33.

A cocking arm 45 is mounted in cap 34 which pivots on pin 47. One end of the cocking arm 45 extends beyond the walls of the cap 34. The other end of the arm is in registration with the top of the valve head 41.

Trigger 22 includes bar 50 mounted in a trigger housing 51 secured to the side of cap 34 opposite arm 45. The end of trigger bar 50 extends through a slot in the cap 34 into the upper end of valve bore 37. Trigger bar 50 is normally urged towards valve bore 37 by a spring 53 which is captured in housing 51. A trigger ring 54 is secured to the free end of the trigger bar 50. Cocking arm 45 may be rotated counterclockwise to force valve stem 39 downward. As the upper end of the valve head 41 passes the location of the trigger bar 50, spring 53 urges the bar into valve bore 37 above head 41 thereby capturing same with the lower end of the valve stem 39 in sealing relation with the valve bore 35 in bulkhead 32.

In operation chamber 31 is pressurized through a filter-bleeder chamber valve tube described. The trigger bar 50 is then retracted by pulling on trigger ring 54. By reason of the larger area of the valve head 41 as compared with the area of the lower end of valve stem 39, the valve is driven upward abruptly opening bore 35 thereby releasing the gas pressurizing in chamber 31. The resultant acoustic wave then travels through the lower end of the assembly as indicated by arrow 56 for reflection back to an acoustic detector portion of gun 20.

The detector portion of the gun is housed in the downwardly opening cavity 36 beneath the bulkhead 32 and within the walls of the threaded portion 33. It is noted that the valve bore 35 opens into one side of cavity 36 and it is by way of cavity 36 that the pressure across bulkhead 32 is equalized when the valve bore 35 is opened.

Also included in cavity 36 is a microphone 66 which is a pressure equalized dual acting microphone as will be later described. Pressure equalization of elements in the microphone 66 is achieved by providing a sintered metal air filter 60 and a fabric or cotton air filter 62 both located in a path leading from the mouth of cavity 36 upward, through channel 64 and into the center of the microphone 66. Microphone 66 is secured by suitable fastener to bulkhead 32 as will be further described. The filter element 62 may be a wad of cotton. The sintered metal filter 60 is mounted in the suitable passageway and is secured by a spring clamp 61.

FIG. 4

FIG. 4 is a bottom view of the unit of FIG. 3, illustrating the relative locations of the valve bore 35 extending through bulkhead 32 and the microphone mounted substantially centrally of cavity 36. The sintered metal filter 60 is shown held in place by locking spring 61 which has legs which are received in shallow holes at the lower edge of the microphone 66. Spring 61 has a curved center portion 61a that registers in a shallow groove in the inner wall of the threaded extension 33.

FIGS. 5-9

As above indicated, the detector portion of gun 20 comprises a pair of filters 60 and 62 arranged in a series relationship with a flow channel 64 extending from filter 62 into a microphone 66. Microphone 66 comprises a metal block having shallow circular wells or recesses in opposite main faces. Thin steel discs 68 and 70 are mounted in the shallow wells. A piezoelectric disc 72 is mounted on steel disc 68. A second piezoelectric disc 74 is mounted on steel disc 70. After mounting discs 68 and 70 with piezoelectric discs 72 and 74 thereon, the shallow wells are preferably filled with layers 72a and 74a of suitable epoxy. Tube 33a then serves to somewhat shield the microphone 66 from the shock created when port 35 is opened. Discs 68 and 70 as mounted in the shallow wells formed in the block 66 undergo deflections upon application of pressure differentials across the detector to cause generation of signals across the ceramic discs. The same polarity faces of each of discs 72 and 74 are electrically grounded to discs 68 and 70. The outer faces are connected together so that the discs electrically are in parallel. Electrical leads 80 extend from the discs 72 and 74 and course upward through microphone 66, bulkhead 32 and chamber 31 and thence through cap 34 to a suitable electrical connector 57 which leads to the channel 23 of FIG. 1.

In FIG. 5, the microphone block 66 has four vertical bores, three of which extend through the block and one of which extends over halfway through the block. More particularly, a reentrant bore 82 receives a screw or bolt 84 which extends upward and serves to securely attach the microphone block 66 to the bottom surface of bulkhead 32.

A reentrant bore 86 extends downward from the top of the block 66 and receives a valve stem 88 which threadedly mates in the upper end of the bore 86. At the lower end of the bore 86 is a lateral bore 90 which opens the bottom of bore 86 outward into the spaces beneath discs 68 and 70. The upper end of reentrant bore 86 is provided with an O-ring to seal the junction of bore 86 and bore 64 shown in FIG. 2. Valve stem 88 is so constructed that when the pressure on the outside of the discs 68 and 70 exceeds the pressure on the inside by a predetermined amount, the valve 88 will open, thus preventing an excesssive differential pressure on the discs 68 and 70.

A third bore 92 extends through the microphone block 66 and serves as a channel for the electrical conductor 80.

A fourth reentrant bore 94 receives a second valve stem 96. A transverse bore 98 intersects bore 94 so that when the pressure inside the microphone exceeds the pressure outside the microphone by a predetermined amount, the valve stem 96 will permit flow out of the inner portions of the microphone.

As shown in FIGS. 5 and 7, a slot 100 extends across one edge of the block 66 with a relatively shallow depth. A horizontal bore 102 serves to connect the slot 100 to the bore 92 so that electrical lead 80 can be brought out of the bore 92 with branches of the conductor 80 extending in opposite directions from bore 102 through slot 100 and thence to electrical connecting points on the faces of piezoelectric discs 72 and 74.

FIG. 10

FIG. 10 is an exploded view of the system including elements thus far described. The body of the unit comprises a square block forming the housing 30 with the chamber 31 center bored down to the level of the bulkhead and with the hollow cylindrical threaded connector section 33 formed at the lower end thereof. Cap 34 is square in shape to correspond with the upper end of the housing 30. An O-ring 34a is mounted in a slot in the bottom of the cap 34 to provide a gas tight seal between cap 34 and the body 10. Cap 34 is secured to the housing 30 by four cap screws one of which, the screw 34b, is shown. Holes at each of the four corners of the cap are aligned with threaded holes such as the hole 30a in the top of the body 30. The valve stem 39 is shown in position to receive O-rings 43 and 43a at the upper and lower ends thereof respectively. The housing 51 of the trigger unit 22 threadedly engages the port in the side of the cap 34.

A microphone electrical wire tube 110 is provided for mating with a hole 34c in the cap 34. The lower end of tube 110 passes through the bulkhead in the body 30 and extends into the bore 92 in microphone 66 and thus provides a passageway for electrical conductor 80 to extend through fittings 57a and 57 which are provided so that the circuit 23, FIG. 1, may be completed to recorder 24. A suitable sealing means such as an O-ring 110a is mounted on the bottom end of tube 110 to provide a liquid tight seal between tube 110 and a port (not shown) through bulkhead 32 which port is aligned with bore 92 in microphone 66. The O-ring in the upper end of the bore 92 as shown in FIG. 5 serves further to seal the tube 110 to the microphone 66.

Valve 55 is a filler-bleed valve for pressurizing and bleeding chamber 31. It has a threaded section 55a which is received in a threaded portion of the port 34e. Port 34e extends horizontally into a blind bore (not shown) in the bottom of cap 34, thereby to connect bore 34e into the chamber 31. A valve core 55b is mounted in bore 34e beneath the filler-bleed valve 55. An O-ring 55c provides for a fluid type seal between the stem of valve 55 and bore 34e. The center portion of the filler-bleed valve 55 is provided with a tube through which an external pressurized container may be connected to pressurize the chamber 31. The valve core prevents back flow. The filler-bleed valve 55 from chamber 31 may be served further into cap 34 to open valve 55b thereby to bleed gas from chamber 31. By this means, the valve 55 performs the double function of accommodating pressurization of chamber 31 and bleeding of pressure from chamber 31.

Microphone 66 includes valve core 96 in place in bore 94. A microphone pressure seal 95 is provided to be placed in the upper end of bore 94 to seal the same, thereby permitting flow of air from within the microphone 66 only through the valve core 96 to atmosphere below the microphone 66.

A tube 111 provides a fluid connection from the zone inside connector 33 into the cap 34. A horizontal bore 34d communicates with a vertical bore in cap 34 and receives a valve unit 112 which may be opened for the purpose of bleeding off gas pressure between the valve 16 and gun 20 as shown in FIG. 1 when valve 16 is closed after having been opened to expose the bottom of the gun 20 to annulus pressures. Bleeding the pressure between gun 20 and valve 16 is a necessary precaution to be observed before removal of the gun 20 from the well head. The upper end of casing pressure bleed tube 111 seats in a downward opening blind bore (not shown) in cap 34 which blind bore is intersected by horizontal bore 34d. Casing pressure bleed valve 112 is threadedly received in bore 34d and may open or close tube 111 to the atmosphere. The bleed valve 112 is a poppet type valve.

An O-ring 111a is mounted on the lower end of the casing pressure bleed tube 111 to provide a seal between tube 111 and a port (not shown) to the bulkhead 32.

Pin 47 serves as the pivot for cocking arm 45. Pin 47 is installed by inserting it through bore 34f which intersects vertical bore 34c. Thereafter electrical connector 57a is served into bore 34c which then confines pin 47. A set screw 47a is threaded into a suitable threaded section in the mouth of bore 34f to retain both electrical connector 57a and pin 47.

By way of example, a preferred embodiment of the invention has a ten cubic inch volume chamber 31. When working with a casing pressure of less than 100 p.s.i., the chamber 31 normally is pressurized to approximately 150 p.s.i. Upon opening the valve bore 35, gas is discharged from chamber 31 through the valve 16 and into the annulus within casing 10. This creates a pressure pulse.

In the embodiment above described, orifice 35 is one-fourth inch in diameter. Bore 37 is three-eighths inch in diameter. Valve 39 is a double ended, double O-ring valve with the larger diameter portion working between atmospheric pressure and the pressure in chamber 31. Good results are thus obtained when operated in the explosion mode.

The system can be operated in the implosion mode if the casing pressure is sufficient (i.e., if it is above about 100 p.s.i.). To operate the gas gun assembly in the implosion mode, the gas valve 39 is moved to close port 35. The pressure in the chamber 31 is then bled off through valve 55 to a reduced or atmospheric pressure. Valve 55 is then closed. The annulus pressure is still imposed on the bottom of valve stem 39. In such condition, when the trigger bar 50 is retracted, the valve bore 35 is forced open. The casing annulus gas then flows into the chamber 31. This creates a rarefaction pulse in the annulus. The unit herein described may be operated in the implosion mode at pressures up to 1500 p.s.i.

which is its maximum rated pressure. The rarefaction pulse results in collar reflections and a gas-liquid interface signal. Signals obtained with the gun 20 at high charge pressures have been found to be approximately five times greater than obtained by use of conventional units in which 10-gauge blank shotgun shells are used as the pressure source.

The microphone 66 is a twin disc, pressure compensated microphone and converts pressure pulses into electrical signals. In one embodiment, the ceramic discs 72 which 74 are one inch in diameter and 0.010 inch thick. They are cemented onto stainless steel discs 68 and 70 of 1.5 inches diameter and 0.040 thickness. The steel discs 68 and 70 contact like polarity surfaces of the ceramic discs 72 and 74. By such construction, vibrations are cancelled if the outside of the ceramic discs are connected together as the input. If the stainless steel disc is subjected to excessive pressure it will bend as to break the ceramic disc. To prevent damage the inside of the microphone is compensated as was described to assure a differential pressure of no more than approximately 70 p.s.i.

By the above construction, a highly sensitive microphone is provided which is pressure compensated and which cancels vibrations and is responsive to pressure pulses. It provides a high signal to noise ratio output.

Thus, in accordance with the invention, a gas gun is provided for measurement of the liquid level depth in an oil well by way of a well head.

A gun body has means for connection to the well head. It has an internal chamber with a flow path structure including a valve bore for fluid flow between the chamber and the well head.

A valve is movable to open and close the valve bore.

A means is provided to establish a pressure differential between the chamber and the well head with the valve bore closed by the valve.

A pressure actuated means is then provided actuate the valve abruptly to reduce the pressure differential and transmit an acoustic wave to the well head.

Having described the invention in connection with certain specific embodiments thereof, it is to be understood that further modifications may now suggest themselves to those skilled in the art and it is intended that such modifications as fall within the scope of the appended claims be covered thereby.

What is claimed is:

1. A gas gun assembly for measuring depths of reflectors in a well bore comprising:
   (a) a housing having an upper central chamber with a bottom bulkhead through which a first valve bore passes;
   (b) coupling structure below said bulkhead for securing said housing to said well;
   (c) a cap secured to close said chamber and having a second valve bore therethrough of diameter larger than the diameter of said first valve bore and located in axial alignment with said first valve bore;
   (d) a valve stem having one end axially movable within said second valve bore while closing the same and the other end movable into and out of said first valve bore;
   (e) means to establish a pressure differential across said bulkhead; and
   (f) means to release said valve stem for rapid equalization of pressure across said bulkhead thereby to produce an acoustic pulse in said well bore below said bulkhead.

2. The combination set forth in claim 1 in which a microphone is mounted within said coupling structure and connected through said bulkhead and said cap for generation and transmission of electrical signals representative of pressure variations in the region of said coupling structure.

3. The combination set forth in claim 1 in which valve means in said cap is flow connected through said bulkhead into the region of said coupling structure to selectively vent the region within said coupling structure to atmosphere through said cap.

4. The combination set forth in claim 1 in which a pressure compensated microphone is mounted below said bulkhead within said coupling structure.

5. The combination set forth in claim 2 in which said microphone comprises a pair of piezoelectric discs mounted back to back and connected in parallel.

6. The combination set forth in claim 5 in which a microphone block mounts said discs to enclose a gas tight internal cavity and in which flow structure is provided for preventing excessive pressure differentials across said discs.

7. The combination set forth in claim 6 in which air filter means are provided in said flow structure for avoiding entry of debris into said cavity.

8. A gas gun assembly for measuring depths of reflectors in a well bore comprising:
   (a) A housing having an upper central chamber with a bottom bulkhead through which a first valve bore passes;
   (b) coupling structure below said bulkhead for securing said housing to said well;
   (c) a cap secured to close said chamber and having a second valve bore therethrough of diameter larger than the diameter of said first valve bore and located in axial alignment with said first valve bore;
   (d) a valve stem having one end axially movable within said second valve bore while closing the same and the other end movable into and out of said first valve bore;
   (e) means to establish a pressure differential across said bulkhead;
   (f) means to release said valve stem for rapid equalization of pressure across said bulkhead thereby to produce an acoustic pulse in said well bore below said bulkhead; and
   (g) lever means in said cap mounted to engage the head of said valve stem to force the lower end of said valve stem into said first valve bore.

9. The combination set forth in claim 8 in which a releasable trigger bar is spring biased for lateral entry in said second valve bore to lock said valve stem when said lower end is forced into said first valve bore.

10. A gas gun assembly for measuring depths of reflectors in a well bore comprising:
   (a) a housing having an upper central chamber with a bottom bulkhead having a first valve bore therethrough;
   (b) coupling structure for securing the housing to said well;
   (c) a cap secured to close said chamber and having a second valve bore therethrough of diameter larger than the diameter of said first valve bore and located in axial alignment with said first valve bore;
   (d) a valve stem having one end axially movable within said second valve bore while closing the same and the other end movable into and out of said first valve bore;

(e) means to establish a pressure differential across said bulkhead;

(f) means to release said valve stem for rapid equalization of pressure across said bulkhead thereby to produce an acoustic pulse in said well bore below said bulkhead; and (g) a valve means in said cap connected selectively to vent the region below said bulkhead to atmosphere.

11. The combination set forth in claim 10 in which valve means in said cap is connected to vent said chamber to atmosphere.

12. A gas gun for measurement of the liquid level depth in an oil well by way of a well head comprising:

(a) a body having means for connection to said well head and having an internal chamber with a valve bore for fluid flow between said chamber and said well head and structure forming a guide bore which is aligned with said valve bore and is larger in cross section than the cross section of said valve bore;

(b) a valve stem in said chamber movable in said guide bore and movable into and out of said valve bore;

(c) means to establish a pressure differential between said chamber and said well head with said valve bore closed by said valve stem; and (d) pressure actuated means including said valve stem for moving said valve stem in said guide bore and from said valve bore abruptly to reduce said pressure differential and transmit an acoustic wave to said well head.

13. A gas gun for measurement of the liquid level depth in an oil well by way of a well head comprising:

(a) a body having means for connection to said well head and having an internal chamber with flow structure including a valve bore for fluid flow between said chamber and said well head and structure forming a guide bore which is aligned with said valve bore and is larger in cross section than the cross section of said valve bore;

(b) a valve stem movable in said guide bore and movable to close and open said valve bore;

(c) means to establish a pressure differential between said chamber and said well head with said valve bore closed by said valve stem; and (d) pressure actuated means including said valve stem for moving said valve stem in said guide bore and from said valve bore abruptly to reduce said pressure differential and transmit an acoustic wave to said well head.

* * * * *

UNITED STATES PATENT AND TRADEMARK OFFICE
CERTIFICATE OF CORRECTION

PATENT NO.   :   4,408,676
DATED        :   10/11/83
INVENTOR(S)  :   James N. McCoy It is certified that error appears in the above-identified patent and that said Letters Patent is hereby corrected as shown below:

Col. 1, line 27, change "joint" to --joints--.

Col. 2, line 51, change "21" to --23--.

Col. 3, line 54, change "tube" to --to be--.

Col. 3, line 59, change "pressurizing" to --pressurized--.

Col. 5, line 35, change "10" to --30--.

Col. 7, line 9, change "and" to --which--.

Col. 7, line 13, after "0.040" insert --inch--.

Signed and Sealed this

Twenty-first Day of May 1985

[SEAL]

*Attest:*

DONALD J. QUIGG

*Attesting Officer*      *Acting Commissioner of Patents and Trademarks*